United States Patent
Müller

[11] Patent Number: 5,882,159
[45] Date of Patent: Mar. 16, 1999

[54] ELEMENT, METHOD OF ATTACHING THE ELEMENT TO A PLATE-LIKE COMPONENT, COMPONENT ASSEMBLY AND DIE BUTTON

[75] Inventor: Rudolf Müller, Frankfurt, Germany

[73] Assignee: Profil Verbindungstechnik, GmbH & Co., Germany

[21] Appl. No.: 948,746

[22] Filed: Oct. 10, 1997

Related U.S. Application Data

[63] Continuation-in-part of Ser. No. 698,870, Aug. 16, 1996, Pat. No. 5,782,594.

[30] Foreign Application Priority Data

Mar. 12, 1997 [DE] Germany .................. 197 10 246.8

[51] Int. Cl.$^6$ ............. F16B 37/04; F16B 39/00
[52] U.S. Cl. ............. 411/179; 411/180; 411/427
[58] Field of Search ................... 411/179, 180, 411/181, 427, 107, 176

[56] References Cited

U.S. PATENT DOCUMENTS

| | | |
|---|---|---|
| 3,213,914 | 10/1965 | Baumle et al. . |
| 3,234,987 | 2/1966 | Hentzl . |
| 3,253,631 | 5/1966 | Reusser . |
| 3,299,500 | 1/1967 | Double . |
| 3,469,613 | 9/1969 | Steward . |
| 3,506,050 | 4/1970 | Pouch et al. . |
| 3,648,747 | 3/1972 | Steward . |
| 3,793,658 | 2/1974 | Ladouceur . |
| 3,810,291 | 5/1974 | Ladouceur . |
| 3,927,465 | 12/1975 | Ladouceur et al. . |
| 4,484,385 | 11/1984 | Woods . |
| 4,637,766 | 1/1987 | Milliser . |
| 4,708,556 | 11/1987 | Pamer et al. ............... 411/179 |
| 5,340,251 | 8/1994 | Takahashi et al. ........... 411/180 X |
| 5,531,552 | 7/1996 | Takahashi et al. ........... 411/179 |
| 5,549,430 | 8/1996 | Takahashi et al. ........... 411/179 |

FOREIGN PATENT DOCUMENTS

| | | |
|---|---|---|
| 0041593A1 | 12/1981 | European Pat. Off. . |
| 0444548A2 | 2/1991 | European Pat. Off. . |
| 0437011A1 | 7/1991 | European Pat. Off. . |
| 0553822A1 | 1/1993 | European Pat. Off. . |
| 0553822B1 | 1/1993 | European Pat. Off. . |
| 0669473A1 | 2/1995 | European Pat. Off. . |
| 0663247A1 | 7/1995 | European Pat. Off. . |
| 0759510A1 | 8/1996 | European Pat. Off. . |

(List continued on next page.)

OTHER PUBLICATIONS

European Search Report on Application No. 93101327.0–.
European Search Report on Application No. 95102794.5.
European Search Report on Application No. 96113103.4.
European Search Report on Application No. 96113103.4 (In English).
European Search Report on Application No. P 195 40 466.7 (In English).

Primary Examiner—Neill Wilson
Attorney, Agent, or Firm—Howard & Howard

[57] ABSTRACT

An element, for example an element with a hollow body or a bolt element, in particular a nut element, for attachment to a plate-like component, has a ring-shaped recess or annular groove present at an end face of the element facing the component within a raised ring-shaped contact surface. At least one undercut is preferably provided in a side wall of the recess, and also features radial recesses and noses which extend into the ring recess providing security against rotation. A cylindrical punch section or pilot concentric to the central longitudinal axis of the element projects at the said end face within the ring-shaped recess and the outer boundary wall of the cylindrical punch section preferably has ring-shaped undercut. A material supply is formed at or adjacent to the free end face of the cylindrical punch section and is displaceable at least locally by means of a die button on insertion of the element into the ring-shaped recess in order to capture or clamp material of the component which has previously been deformed by the die button into the ring-shaped recess between itself and the base surface of the ring recess. In this way an improved security against rotation, an increased press-out resistance and an improved behavior against alternating loads in operation is achieved.

21 Claims, 4 Drawing Sheets

5,882,159
Page 2

FOREIGN PATENT DOCUMENTS

| | | |
|---|---|---|
| 2560305A1 | 12/1984 | France . |
| 2598189A1 | 11/1987 | France . |
| 2607562A1 | 6/1988 | France . |
| 2688835A1 | 3/1992 | France . |
| 2227039 | 12/1972 | Germany . |
| 2441977A1 | 3/1975 | Germany . |
| 2229499C3 | 1/1976 | Germany . |
| 2545581A1 | 4/1977 | Germany . |
| 3019070A1 | 5/1981 | Germany . |
| 3132599A1 | 9/1982 | Germany . |
| 3149408A1 | 6/1983 | Germany . |
| 3314487A1 | 11/1983 | Germany . |
| 2441977C2 | 4/1985 | Germany . |
| 3524306A1 | 1/1986 | Germany . |
| 3447006C2 | 6/1988 | Germany . |
| 3704763C1 | 10/1988 | Germany . |
| 195304667 | 1/1996 | Germany . |
| 19530466A1 | 2/1997 | Germany . |
| 806650 | 12/1958 | United Kingdom . | ated.
ELEMENT, METHOD OF ATTACHING THE ELEMENT TO A PLATE-LIKE COMPONENT, COMPONENT ASSEMBLY AND DIE BUTTON

RELATED APPLICATIONS

This application is a continuation-in-part application of U.S. Ser. No. 698,870 filed Aug. 16, 1996 now U.S. Pat. No. 5,782,594 which claims priority to German Application No. 19530466.7 filed Aug. 18, 1995. This application also claims priority to German Patent Application No. 197 10 246.8 filed Mar. 12, 1997.

FIELD OF THE INVENTION

The present invention relates to an element, for example a fastening element such as a hollow nut element or a bolt element in particular a nut element, for attachment to a plate-like component, wherein an annular or ring-shaped recess or groove is present at an end face of the element facing the component within a raised annular or ring-shaped contact surface, wherein at least one undercut is preferably provided in a side wall of the recess, and also features providing security against rotation are provided and wherein a cylindrical punch or pilot section concentric to the central longitudinal axis of the element projects at the said end face within the ring-shaped recess and the outer boundary wall of the cylindrical punch section has a preferably ring-shaped or annular undercut. In addition, the present invention relates to a method of attaching such an element to a plate-like component, to a component assembly and to a die button for use in the method for attaching the element to a plate-like component.

BACKGROUND OF THE INVENTION

An element of this type is known from U.S. Pat. No. 3,648,747, and also from the U.S. Pat. Nos. 5,340,251, 3,234,987 and 3,253,631.

Further elements of this type are known from the European patent application with the publication number EP-A-0 553 822 or the corresponding U.S. Pat. No. 5,340,251 and also from the European application with the publication number EP-A-0 669 473.

A similar element is also known from the European application with the publication number EP-A-0 663 247; however, this application is concerned with the manufacturing of an element of this kind rather than with the element itself.

Such elements are generally formed as elements with hollow bodies, or more precisely as nut elements, but could however also for example have a smooth cylindrical bore to receive a spigot. In addition, such elements could also be formed in the manner of bolt elements and in which case the head of the bolt element is secured to the sheet metal part or to the plate-like component and the head would have the above described design. Finally, the element can be regarded quite generally as a functional element, whereby it is possible to realize diverse functions. For example, the function of a nut through the provision of an element with a hollow body having an internal thread, or the function of a bolt by the provision of a shaft or spigot (tubular) part, or the function of for example a pin for the clamped attachment of other components, such as carpet eyes, or electrical terminals. Ultimately, it is not the function which is important, but rather the joint or attachment between the element and the plate-like component which normally consists of a sheet metal, but with other materials such as plastic panels is also possible.

The known elements in accordance with the above referenced patents and published applications are all elements having hollow bodies which are as a rule formed as nut elements. They all offer a certain degree of security against rotation (twist-out) so that on screwing-in a bolt element a rotation of the element having the hollow body is generally avoided. Moreover, the known elements have a certain press-out resistance. Nevertheless, improved security against rotation (twist-out) and higher press-out resistances are always desirable characteristics for such elements.

It has been shown with the known elements that the elements sometimes tear out of the plate-like component (normally a piece of sheet metal) in operation and under alternating loads. The manufacture of such elements having hollow bodies is also relatively complicated and a problem exists in as much as it is difficult to simultaneously keep the weight of the element small and to make the contact surface of sufficiently large dimensions.

The undercut in the side wall of the ring-shaped recess, which is necessary to produce the required press-out resistance of the hollow body is normally achieved by subjecting the element having a hollow body to a deformation or crushing process at the peripherally extending outer surface, whereby the side wall of the ring-shaped recess is brought from an initially axially parallel position into an inclined position. In this way, the opening to the ring-shaped recess between the pilot part and the now inclined side wall is reduced in comparison to the base surface of the recess and the undercut is produced. Through this crushing process, the element having the hollow body however also has an inclined flank at the outer jacket surface adjacent to the end face confronting the component. This can lead to a situation in which the contact surface at the end face of the element becomes too small, with the contact surface being so deformed during the attachment of the plate-like component that it acts in a knife-like cutting manner under load and a high surface pressure results between the component and the element having the hollow body.

As a result of this high surface pressure, the plate-like component yields or relaxes after a few hours of operation and the element is no longer as tightly attached to the component as desired. This leads eventually to settling or relaxation, so that the prestress of a bolt inserted into the element reduces to zero, whereby the bolted connection fails.

The inclined flank at the transition from the outer jacket surface into the end face of the element however also results in an unnecessary waste of material which is generally steel, because material which is present radially outside of the contact surface at the element does not provide any contribution to the strength of the connection or of the element. In other words, the elements are heavier than is absolutely necessary, which ultimately represents an economic disadvantage.

OBJECTS AND SUMMARY OF INVENTION

An object of the present invention is to further improve an element of the above describe kind in such a way that on the one hand the security against rotation and/or the press-out resistance are improved but, on the other hand, with the manufacture of the element being simplified, and with the further development preferably also being effected in such a way that a saving of material is possible. It should also be ensured that the characteristics of the element, i.e. the connection to the sheet metal part with respect to alternating loads is improved, i.e. the danger of settling of the element and reduction of the prestress force and eventual tearing of the element out of the sheet metal part should be substantially reduced.

In order to satisfy these objects, the element of the invention is characterized in that a material supply is formed at or adjacent to the free end face of the cylindrical punch section and is displaceable at least locally by means of a die button on insertion of the element into the annular or ring-shaped recess in order to capture or clamp material of the component which has previously been pressed by the die button into the ring-shaped recess between itself and the base surface of the ring recess.

A method for the insertion of an element of this kind is characterized in that the punch section of the element is indented locally at its end face using a die button which has teeth, for example from two to six teeth, which are arranged radially within its projecting cylindrical punch section, which project radially inwardly into the central passage of the die button and are set back from the end face of the projecting cylindrical section of the die button so that material is deformed and displaced from the punch section of the element into the ring recess in such a way that it projects from the inner side wall of the ring recess, at least substantially radially into the ring recess and there overlies material of the plate-like component which has previously been pressed into the ring recess by the end face of the projecting cylindrical section of the die button and preferably clamps this material between itself and the base surface or bottom wall of the ring recess.

The invention recognizes that in some elements of this type, it is difficult to ensure, in practical operation, that the sheet material is actually and always reliably deformed into the undercut in the cylindrical punch section. If this is, however, not ensured, then the security of the form-locked connection of the component to the undercut in the outer side wall of the ring-shaped recess is questionable. On the one hand, the security against rotation suffers, as does also the press-out resistance on the other hand. The stability in operation in the event of alternating loads is in many cases deficient.

With the previously known elements, a deformation of the cylindrical punch section is not intended and is also not possible, because otherwise the danger would exist that the inner thread of the nut element is deformed, whereby a bolt or screw cannot be threaded into the bore and the element would become unusable. One could indeed theoretically increase the radial dimensions of the cylindrical punch part, in order to reduce the danger of deformation of the thread cylinder. This would, however, lead to a situation in which the elements would become heavier and in which the contact surface would always be displaced further outwardly, so that one would always have to work with larger and thicker washers, in order to transfer the load from the bolt element to the nut element, whereby the connection as a whole become heavier and more expensive.

The invention here intentionally takes a different route in that the cylindrical punch section is not deformed in the sense of folding it over onto the sheet metal material in order to clamp the latter, but rather only a small portion of the cylindrical punch section is locally displaced downwardly relative to the remainder of the punch section by the die button, and thereby clamps the material of the component previously pressed into the peripherally extending recess between itself and the base surface of the ring recess. On the one hand, the form-locked connection between the element and the component is improved in the sense that at these locations the material of the component fully fills out the opening which is present, i.e. the undercut at the cylindrical punch section is fully filled out. On the other hand, the material displacement ensures that the end face of the die button permanently prestresses the material of the component in the region of the recess, whereby an even higher quality joint can be ensured.

Since the teeth of the die button, which are responsible for this material displacement, are only locally present within the through passage of the die button and have relatively small dimensions, it is possible to dispose of the punch slug which is punched out of the sheet metal part by the cylindrical punch section or pilot of the element through the through passage of the die button as desired, and indeed without having to provide a corresponding plunger at the setting head side with the task of pressing the punch slug through the through passage of the die button. A preceding hole punch is also not required. The element is preferably self-piercing.

Through this type of connection, a deformation of the thread is not longer a concern. It is only necessary to provide the cylindrical punch section of the element with a small supply of material which is suitable for this material displacement.

It is also particularly advantageous of the invention that one and the same element can be used with components of different thicknesses, so that it is for example entirely possible to cover with just one element the sheet metal thicknesses which are customary in the design of coachwork or car bodies. The invention is, however, particularly advantageously usable with thin and high-strength sheet metal because the problem of non-complete filling of the base region of the ring recess by the sheet metal material is particularly acute here.

Although a substantial improvement of security against rotation, of the press-out force and of the resistance to alternating loads is already provided by the above discussed features, it is also possible to achieve further improvements as disclosed in this application.

For example, the outer side wall of the recess may be so designed that it is of at least substantially polygonal shape in plan view in a manner known per se. In this way the security against rotation is improved relative to a round design of the ring recess.

The security against rotation can, however, be further increased if the recesses, which are mutually spaced from one another, are provided in the raised, peripherally extending contact surface, with these preferably being formed in such a way that they form radially inwardly projecting raised portions or noses at the outer side wall of the recess which form the undercuts.

It is also possible to provide noses which result in security against rotation in the region of the transition from the base surface of the ring shaped recess into the outer side wall and/or in the region of the transition between the base surface of the ring-shaped recess and the cylindrical punch section, and in both cases the noses providing security against rotation are preferably uniformly distributed around the element and are approximately triangular in plan view.

A particularly preferred embodiment of the element is characterized in that the cylindrical punch section which preferably has a ring-like undercut has a ring-like end face which is arranged at least substantially perpendicular to the central longitudinal axis of the element or of the punch section and merges via a ring shoulder into a ring region of the cylindrical punch section of larger diameter, with this ring region being set back from the free end face of the cylindrical punch section.

This embodiment leads, on the one hand, to the material which is displaced by the teeth of the die button originating from the ring shoulder region of the punch section, i.e. from a region radially outside of the annular or ring-like end face of the cylindrical punch section, whereby the danger of deformation of the thread is reduced. Moreover, it is easier to deform material from this region in such a way that the desired form-locked connection with the sheet material results.

Since the annular or ring-like end face of the cylindrical punch section or pilot lies radially within the ring shoulder, it leads to an easy deformation of the outer ring region of the punch slug, whereby the latter can be more easily disposed of past the teeth through the central passage of the die button without jamming having to be feared in this region.

Through the provision of noses or webs in the region of the ring shoulder of the cylindrical punch section, with the noses or webs preferably extending from the free end face of the cylindrical punch section up to the outer diameter of the ring-like region of the cylindrical punch section and being of approximately triangular shape in side view, this results in stiffening the element in this region on the one hand, but also in improving the piercing behavior on the other hand, because the plate-like component is ultimately pierced in the region of the ring shoulder, i.e. not at the free end face of the cylindrical punch section.

A particular advantage of the element in accordance with the present invention lies in the fact that it can be used with sheet metal parts of different thicknesses, i.e. one and the same element can be used for almost all the sheet metal thicknesses which are encountered in the construction of vehicle bodywork, i.e. sheet metal thicknesses from approximately 0.5 mm up to 3 mm or more. The die button simply has to be matched in each case to the prevailing sheet metal thickness.

Particularly preferred embodiments of the element and also of the method of inserting the same can be seen from the appended claims, the drawings and also from the subsequent description.

The invention will subsequently be explained in more detail with reference to embodiments and to the drawings.

DESCRIPTION OF PREFERRED EMBODIMENTS

Figure 1:
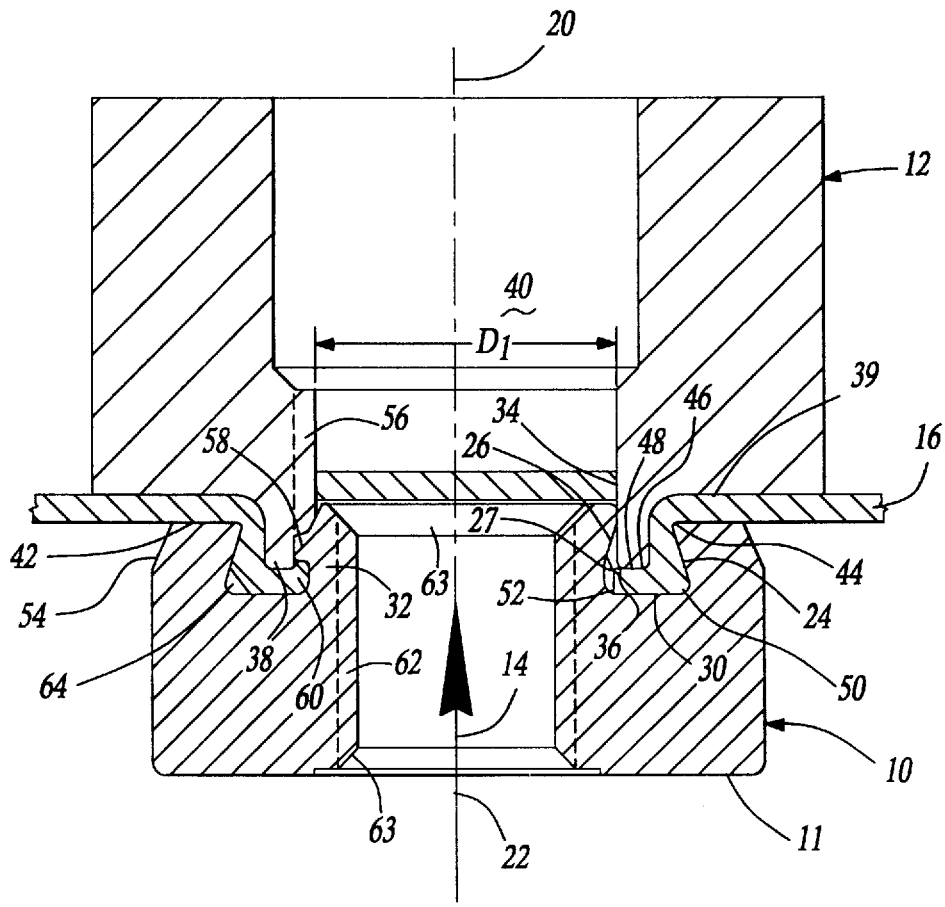
FIG. 1 is a schematic longitudinal cross-sectional view through a nut element with piercing behavior and also through a die button, which cooperates with the nut element during formation of the connection to a sheet metal part.

FIG. 1 first shows a longitudinal cross-section through an element 10 having a hollow body and through the die button 12 which cooperates with it immediately after carrying out an element installation procedure in which the sheet metal part 16 has been deformed into a ring recess 18 of the element 10, as a result of relative movement of the element 10 having the hollow body in the direction of the arrow 14 onto a sheet metal part 16 supported on the die button 12.

Generally, the arrangement is in the opposite direction to the illustrated arrangement, i.e. the element 10 is pressed from above by a setting head onto the sheet metal part and onto the die button lying beneath it. The element 10 is generally moved or fed by an installation or setting head (not shown) aligned coaxial to the central longitudinal axis 20 of the die button, i.e. the central longitudinal axis 22 of the element 10 should be aligned with the central longitudinal axis 20 of the die button.

The arrangement is normally arranged such that the setting head for the element 10 is attached to the upper tool of the press or to an intermediate plate of the press (not shown), whereas the die button 12 is associated with the lower tool of the press, or is arranged in or on the lower platen of the die press. However, the inverted arrangement of FIG. 1 is also possible. It is also not essential to use a press for the setting or installation process. For example a robot can be used to carry out the setting process.

At the right-hand side of FIG. 1 one can see a cross-section through the ring recess or annular groove 18 in the region of the end face of the hollow element 10 confronting the sheet metal part 16 or the die button 12, with this ring recess 18 being bounded at the radially outer side by an outer side wall 24, and at the radially inner side by an inner side wall 26 and at the bottom by a base surface or bottom wall 30 which preferably extends perpendicular to the central longitudinal axis.

In the cross-sectional illustration of the right-hand side of FIG. 1, the outer side wall 24 is inclined and thus forms an opening at the entry the ring recess 18 which is narrower in comparison to the radial dimension of the base surface 30, sometimes referred to as a re-entrant groove. The inner side wall 26 is formed by the radially outer surface of a cylindrical punch section or pilot 32 of the hollow element 10.

In plan view the ring recess can be circular, or it can also be of polygonal, for example octagonal shape at the outer side wall, with both variants are known in the prior art. The cylindrical pilot or punch section 32 appears may be circular in plan view (not shown) with an outer diameter D1 which corresponds at least substantially to the inner diameter of the die button 12 in the region of the sheet metal part, but which is functionally slightly smaller than the inner diameter of the die button opening. The cylindrical side wall 26 has an undercut in similar manner to the outer side wall of the ring recess 18, and axially beneath the ring-like piercing surface 34 at the free end face of the cylindrical punch section 32.

Figure 4:
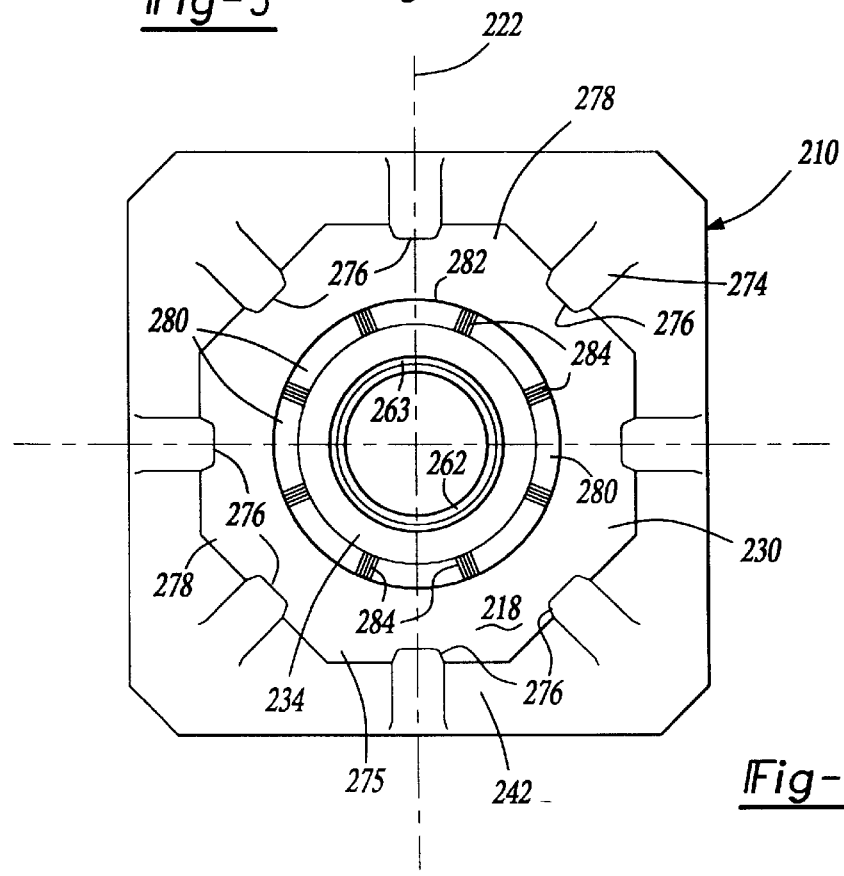
FIG. 4 is a plan view of the element of FIG. 3 as seen in the direction of view arrow IV of FIG. 3, but prior to the insertion into a sheet metal part.

During the movement of the nut element 14 towards the sheet metal part or vice versa, the sheet metal 16 is pierced by the cooperation between the ring-shaped piercing surface 34 of the cylindrical punch section 32 and the corresponding ring-like piercing edge 36 of the cylindrical projection 38 of the die button 12, with the slug being disposed of through the central passage 40 of the die button 12 as shown. For easier disposal, the central passage 40 of the die button 12 is provided with a larger diameter above its end face. Since the end face 34 of the cylindrical punch section of the hollow element 10 lies a distance H above the contact surface 42 of the hollow element 10, it is the first to contact the sheet metal part 16 during the punch movement. The sheet metal part 16 is then deformed around the rounded shaping edge 44 of the hollow element 10 by the rounded forming edge 46 of the die button 12. The end face 48 of the projecting cylindrical part or pilot 32 of the die button 12 presses the sheet metal against the base surface 30 of the ring recess 18 and deforms the sheet material in a way that it can flow, into the undercut of the outer side wall 24, for example at 50, and can flow into the undercut 27 of the radially inner wall of the ring recess 18, as indicated at 52. If the hollow element has a polygonal shape in the region of the outer side wall of the ring shaped recess 18, then the die button 12 is of corresponding polygonal shape in the region of the shaping edge 46, as is for example evident from FIG. 5. When the outer side wall 24 is of polygonal shape, the outer jacket surface 11 of the hollow element is normally provided with a corresponding shape (for example, as shown in FIG. 4) which is, however, not essential.

One notes that the outer jacket surface of the hollow element 10 has an inclined flank 54 around it, with this inclination arising because the material at the outer side of the end of the hollow element 10 is generally deformed inwardly to produce the undercut at the outer side wall 24 of the ring recess 18.

Where the ring recess 18 is of polygonal shape in plan view, a security against rotation is formed by the hooked engagement of the sheet metal material into the undercut 25 of the outer ring wall 24. Through the form-locked, hooked engagement of the sheet material with this outer ring wall, a resistance against press-out is also produced.

One problem with the prior art pierce fasteners of this type is the fact that the deformation of the sheet metal material within the ring recess is not sufficient—particularly with thin and high-strength sheet metal such as carbon steel—to deform the sheet metal material fully into the undercut(s), particularly into the undercut 27 of the cylindrical punch section. This means that the sheet metal material is also not pressed firmly enough against the outer ring wall 24 of the ring recess 18, i.e. that press-out forces and torsional forces are more readily able to at least locally cancel the form-locked, hooked engagement of the sheet metal material with the hollow element 10 and to cause loosening or a loss of the hollow element 10.

Comparing the illustration of the female fastener at the right-hand half of FIG. 1 with a hollow element in accordance with the prior art, for example in accordance with EP-A-0 553 822, the distinction can be seen that a small supply of material is provided in the region of the cylindrical punch section which is indented at three uniformly distributed positions 55 and leads to an improved hooked engagement with the sheet material 16. One of the three positions 55 can be seen to the left-hand side of FIG. 1. The two other positions lie outside of the section plane of FIG. 1 and are thus not visible in FIG. 1.

At the left-hand side of FIG. 1, it can be seen that the die button 12 has a tooth extending in the longitudinal direction of the die button in the region 56, the tooth having locally deformed the material of the cylindrical punch section or pilot 32, in such a way that the material in the outer region of the cylindrical punch section 32 has been deformed downwardly and radially outwardly in FIG. 1, whereby a nose 58 is formed which lies in form-locked manner on the sheet metal material deformed in the ring recess 18. The material 58, which was displaced at this location and also at two further positions downwardly and radially outwardly, ensures that the material in the region 60, i.e. in the region of the undercut 27 is fully surrounded by the material of the hollow element 10, so that a loosening at these three positions is substantially more difficult than in the prior art. Moreover, this displacement of the material of the element leads to the sheet metal material being more firmly pressed into the undercut 25 of the outer side wall 24 of the hollow element, whereby the security against rotation of the connection, and also the press-out resistance are similarly improved.

It is important to note that this deformation of the small supply of material has taken place without damaging the thread cylinder 62 of the hollow element 10. The reference numeral 63 indicates the usual conical chamfers at the ends of the thread cylinder.

Reference 64 is a nose or a web which is preferably arranged in the transition between the base surface 30 of the ring recess 18 and the outer side wall 24. This nose or this web, which is of triangular shape in side view, can optionally be present. Several spaced noses or webs may be uniformly arranged around the central longitudinal axis 22 of the hollow element 10. These noses or webs promote the security of the connection against rotation between the hollow element 10 and the sheet metal part 16 in that the sheet metal part is deformed around the noses into the regions of the undercut 27 lying therebetween. The noses or webs preferably have exposed rounded edges in order to avoid cracks in the sheet material.

Thus, FIG. 1 illustrates an optional modification which can substantially improve the characteristics of the previously known pierce nuts of this kind. The embodiment of FIG. 1 can however be further improved as disclosed below.

Figure 2:
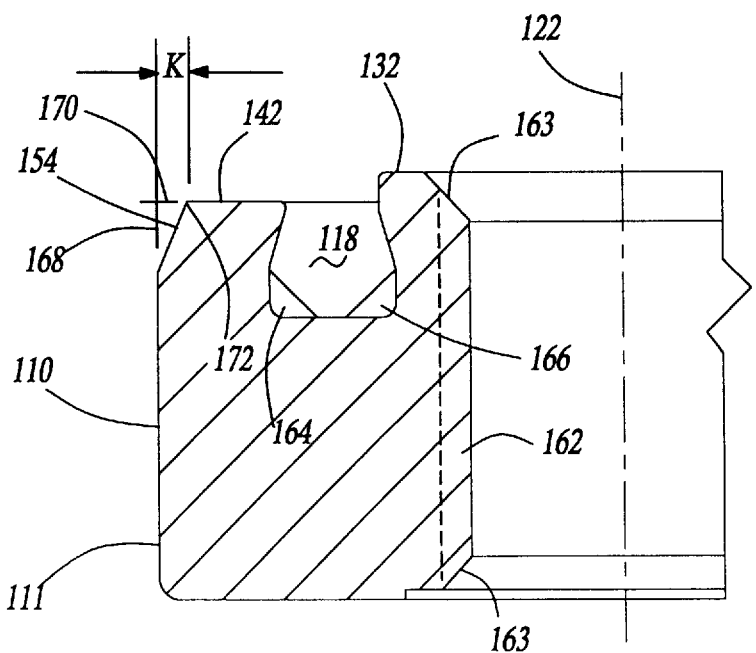
FIG. 2 is a partial side cross-sectional representation of a part of a modified element having a hollow body similar to the element in FIG. 1, with only the region around the cylindrical punch section being shown and with only the left half of the element being illustrated, the right half being identical thereto.

A further possible improvement is shown in FIG. 2, and indeed by the provision of further webs or noses 166 in the transition region between the base surface 130 of the ring-shaped recess 118 and the undercut outer side wall 126 of the cylindrical punch section 132. The noses or webs 166 are formed and arranged in similar manner to the noses or webs 164 and can be provided in place of or in addition to the noses or webs 164.

Further improvements can also be effected.

In the first place, two lines 168 and 170 of FIG. 2 make it clear that the peripheral contact surface 142 of the element is smaller by an amount K, as a result of the inclined flank 154, than would be possible through the outer dimension of the jacket surface 111 of the hollow element 110. This signifies that the material of the hollow element 110 outside of the edge 172 has been largely wasted.

Figure 3:
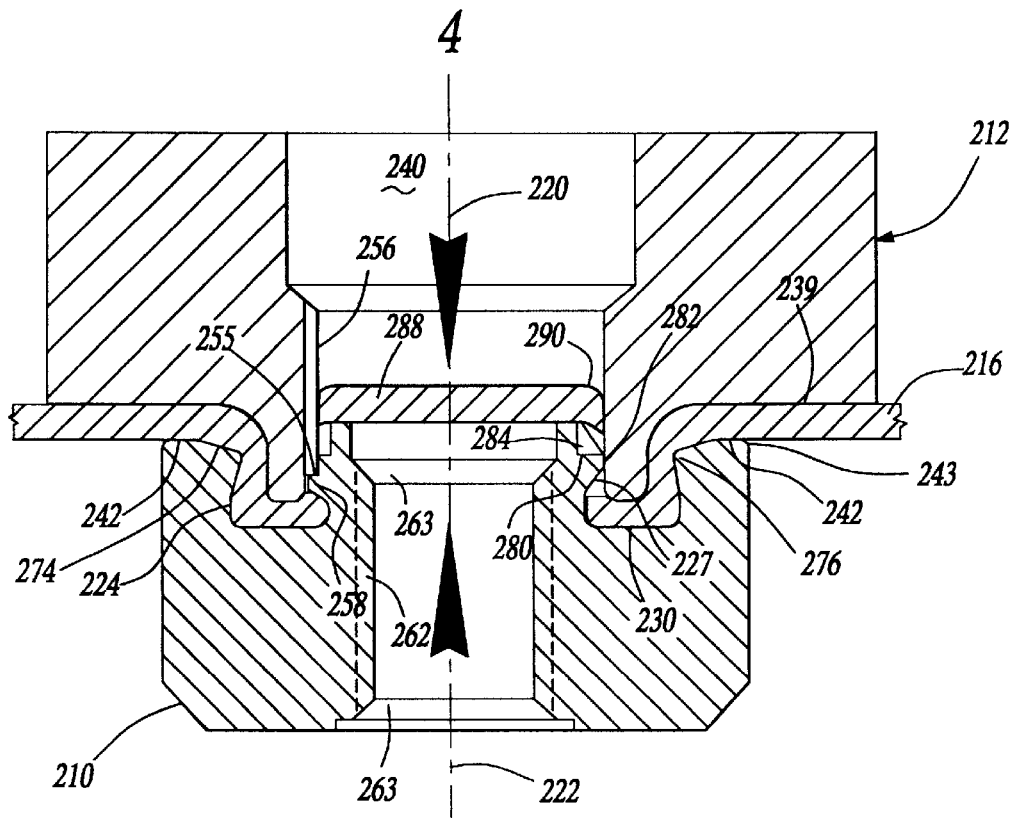
FIG. 3 is a longitudinal cross-sectional view in accordance with FIG. 1, but of the preferred embodiment of the present invention.

A waste of this kind is not present in the hollow element 210 of FIG. 3. In this embodiment, as in all further embodiments, reference numerals in the same sequence are used for common parts, so that it can be assumed that the previous description of the functional design of the parts also applies for parts with similar reference numerals, unless differences are specially described. For example, the female element 10 in FIG. 1 is numbered 110, in FIG. 2, 210 in FIGS. 3 and 4, 310 in FIG. 7, etc. That is to say, only the important deviations with respect to the previously described variants will now be described.

In the embodiments of FIGS. 3 and 4, wedge-like recesses 274 are provided at a total of eight positions around the peripherally extending contact surface 242 of the element and are produced by a cold heading process. These recesses 274 produce noses 276 which project radially into the ring recess 218 and form the undercuts 225 at the corresponding positions in the outer side wall 224 of the ring recess 218.

During the installation process, the material of the sheet metal part 216 is deformed both into the wedge-shaped recesses 274 and also into the regions 278 between the noses 276, whereby an enhanced security against rotation is produced relative to the previous embodiments.

The undercuts are fully sufficient in order to generate a comparable press-out resistance.

Since the undercuts are not formed by the production of an inclined flank (54 and 154 in the previous examples) the contact surface 242 is substantially greater in the examples of FIGS. 3 and 4 than in the previous examples. This improvement achieves lower surface pressures in operation, or permits the use of hollow elements with softer sheet metals. However, the outer dimensions of the hollow element 210 can also be reduced relative to the previous embodiments without concern regarding the loss of technical characteristics. That is to say, the elements are lighter and thus can be manufactured at less cost. The outer edge 243 of the contact surface 242 is simply provided with a small radius, for example 0.5 mm.

The FIGS. 3 and 4 however also illustrate a further improvement of the cylindrical punch section or pilot 232 of the hollow element 210. This embodiment has a ring-shaped end face 234 which however merges via a ring shoulder 280 into a ring region 282 of greater diameter. The material 258, which is displaced by the teeth 256 of the die button 212 over the material of the sheet metal part 216 into the undercut 227 of the cylindrical punch section of the element, originates from the region of the cylindrical punch section beneath the ring shoulder 280, whereby the danger of deformation of the thread cylinder 262 of the nut element is further reduced.

Noses 284, which are approximately triangular in side view, are provided in the region of the ring shoulder 280 and merge at their lower sides into the material of the ring shoulder 280 and in the region of their radially inner sides into the material of the cylindrical end face 234 of the cylindrical punch section. These noses 284, which can readily be seen in plan view in FIG. 4, on the one hand stiffen the cylindrical punch section of the hollow element 210 and, on the other hand, support the ring-like end face 234 of the cylindrical punch section, so that a collapse of the cylindrical punch section in this region is not a concern.

This embodiment leads, on the one hand, to the punch slug 288 being shaped so that it is somewhat rounded in its outer regions, as for example shown at 290, so that it can slide more easily through the central passage 240 of the die button.

The design of the cylindrical punch section in accordance with the embodiments of FIGS. 3 and 4 has, however, also the advantage that the undercut 227 in the region of the cylindrical punch section can be produced by a cold-heading process without the need to deform the cylindrical punch section radially outwardly by complicated rotations. Since this deformation of the cylindrical punch section, i.e. the provision of the ring shoulder 280, the formation of the undercut 227 and the formation of the noses 284, takes place prior to the cutting of the thread cylinder 262 through this deformation of the cylindrical punch section is not a concern. The manufacture of the element of the invention is possible by a cold-heading process and is relatively simple.

Figure 5:
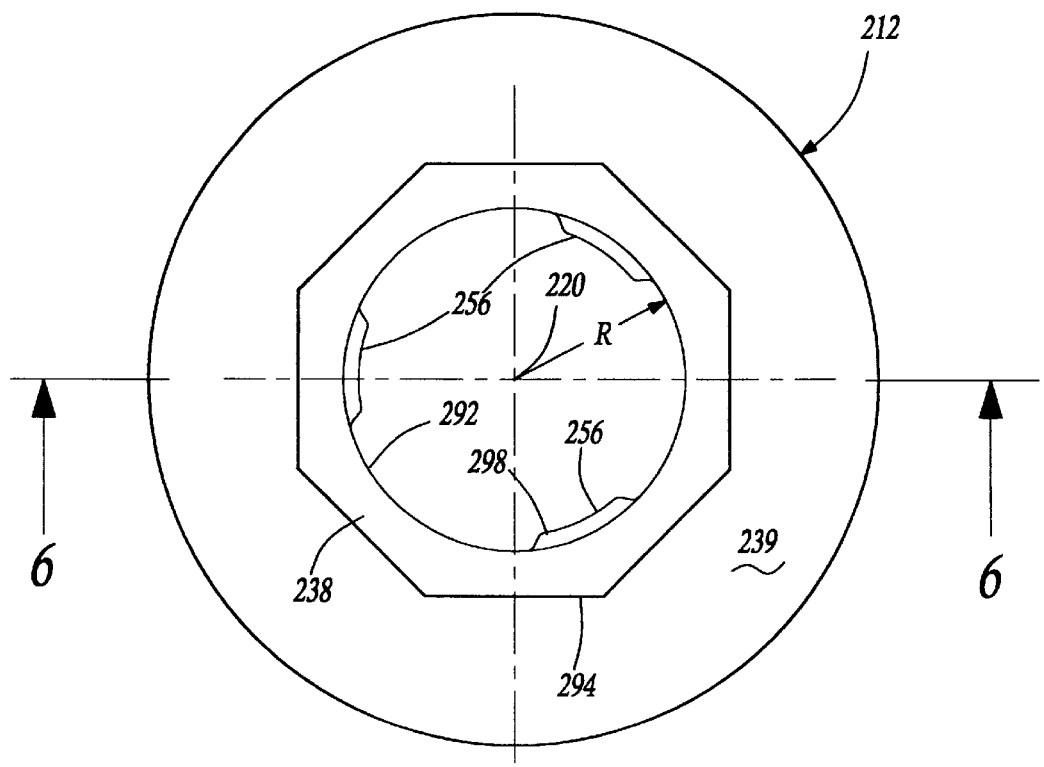
FIG. 5 is a plan view of the end face of the die button of FIG. 3 as seen in the direction of view arrow V, but without a sheet metal part.
Figure 6:
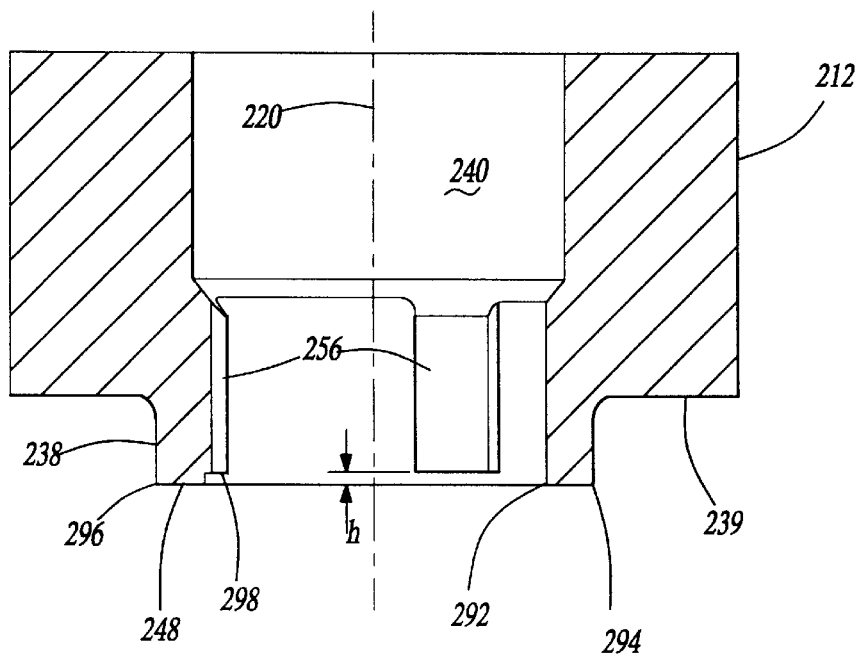
FIG. 6 is a schematic part longitudinal cross-sectional view through the left half of the die button of FIG. 5 in the direction of the section plane VI—VI in FIG. 5.

The FIGS. 5 and 6 show the die button 212 which can used with the element of FIGS. 3 and 4 in an end view and a cross-section respectively. It is evident from the end view of FIG. 5 that the projecting cylindrical section 238 of the die button 212 projects from a ring shoulder 239 extending generally parallel to the contact surface 242 of the corresponding nut element and perpendicular to the central axis 220. The projecting cylindrical section 238 of the die button 212 has a circular peripherally extending piercing edge 292, but a polygonal, here octagonal, radial outer shaping edge 294 which is slightly rounded as shown at 296 in FIG. 6.

The three teeth 256 can be seen in plan view in FIG. 5. It should be noted that these teeth extend over an angular amount of about 30°, in each case related to the central longitudinal axis 222 of the die button, and have a relatively small radial dimension r with respect to the radius R of the central passage of the die button 212 in the region of the end face. The angle of 30° is not critical and is simply given as a guide.

It is evident from FIG. 6 that the end faces 298 of the teeth 256 form step elements which are substantially set back from the free end face 248 of the die button and extend at least substantially radial to the axis 222. This signifies that they first come into use when the punch slug has already arisen through the cooperation between the cylindrical punch section of the hollow element 210 and the peripherally extending circular piercing edge 292 of the die button.

It is ensured through the octagonal shape of the section 238 of the die button 212 of FIG. 5, which is also used in FIG. 3, that the sheet metal material comes to lie in close engagement with the octagonal outer side wall 224 of the ring-shaped recess 218 including in its undercut 225.

Although three teeth 256, which can also be termed ribs or splines, already lead to reasonable results, the number of these teeth in not restricted to three. In principle, any desired number of teeth can be used. With more teeth their respective peripheral dimensions are preferably made smaller.

Finally, it is possible to replace the teeth 256 by a peripherally extending ring shoulder—or step—on the assumption that the punch slug 288 can be disposed of through the chamber 240 which could optionally be achieved by an ejection plunger if necessary, and assuming that the thread cylinder 262 is not damaged or deformed in undesired manner.

Figure 7:
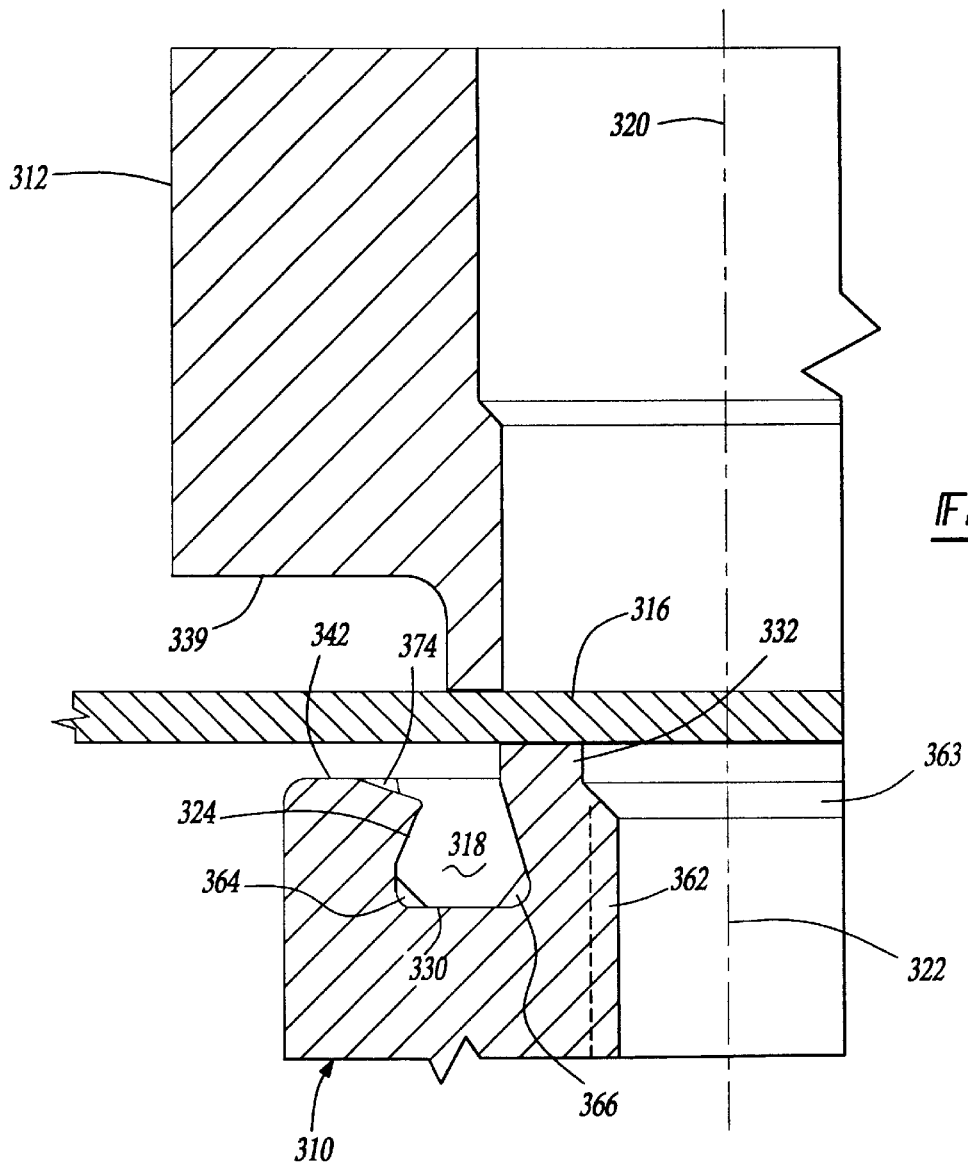
FIG. 7 is a partial cross-sectional side view similar to FIG. 1, of the left half of the longitudinal cross-section and at an earlier stage of the insertion procedure with a further modified female fastener element, the section having been made at a different angular position than in FIG. 1.

FIG. 7 shows an embodiment which falls between the embodiment of FIG. 1 and the embodiment of FIGS. 3 and 4. Here, wedge-shaped recesses 374 are likewise provided in the peripherally extending contact surface 342 of the hollow element 310. The cylindrical punch section 332 would, however, be essentially in accordance with the cylindrical punch section 332 of FIG. 1, i.e. approximately in accordance with the prior art, but with the provision of the required material supply for the deformation by the teeth 356 of the die button (not shown in FIG. 7).

Reference numerals 364 and 366 illustrate that in this embodiment noses or webs can also be provided in the region of the transition between the base surface 330 of the ring-like recess 318 and the outer side wall 324 and/or in the region of the undercut side wall 326.

Figure 8:
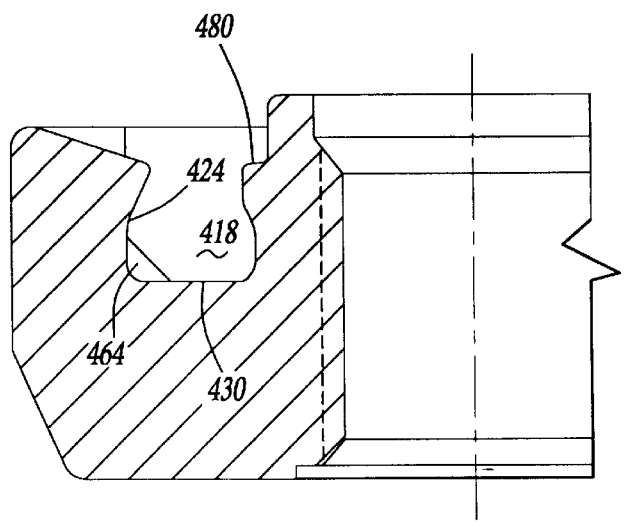
FIG. 8 is a part longitudinal cross-sectional through the left half of a further embodiment of a female fastener element in accordance with the invention.

Finally, FIG. 8 also illustrates a further embodiment of the embodiment of FIG. 3 in which additional noses 464 are provided in the region of the transition from the base surface 430 of the ring-like recess 418 into the outer side wall 424. This embodiment also illustrates that the ring shoulder 480 can optionally be placed somewhat deeper, which can be advantageous in some applications.

The external shape of the element, or of the head portion thereof if the element is a bolt element, can in principle have any desired form. For example, it can be circular, oval, polygonal, or can also have a grooved or pointed contour. In addition, the ring recess or annular groove 18, 118, 218 etc. can also be selected as desired and can therefore also have a circular polygonal, oval, grooved or ring-shaped contour, at least so far as the outer wall of the ring-like recess is concerned. Although the contour of the ring-like recess can in principle be selected independently of the outer contour of the element, or of the head of the element, it will generally be most convenient for the ring-like recess to have an outer contour which is at least substantially of the same shape as that of the outer contour of the element or of the head of the element. The reason for this is that a ring-like recess having a contour other than circular will involve the use of a die button having a projecting cylindrical projection 38, 138 etc. with a matching external contour and thus it is necessary for the die button and the element for which it is used to have the same angular alignment relative to the central longitudinal axis 20, 120 etc. If the ring-shaped recess has an outer contour other than round, then it can most conveniently be aligned if the outer contour of the element, or the head of the element, is of the same or related shape because this ensures that a clear orientation of the element can be specified in the setting head which will match the orientation of the die button in the respective tool. It has already been pointed out that one element can be used with a variety of sheet metal thicknesses, for example from 0.5 mm to 3 mm. Elements in accordance with the present invention can be used also with a wide range of materials. They can in particular be used with any commercially available materials of draw quality, such as FPO steels 3, 4, 5 and higher. In additional, the elements can also be used for so-called ZSTE qualities of high-strength steels up to the highest strength levels, for example also including ZSTE 480. In addition, the elements can be used with aluminum and light alloy metal sheets.

The elements will predominantly be made in cold-forming steel materials in accordance with DIN 1654, although other steels could be used if the elements are formed by machining rather than by cold forming. For strengths above class 8, the cold forming steel materials selected will normally be heat treated in accordance with ISO 898 part 2. Elements made of such cold forming materials are able to satisfy all the normal requirements which arise in industry for the attachment of the elements to sheet metal panels and components.

As explained above, the die button used for the present invention will normally include teeth such as 256 which produce a linear displacement of the material of the element generally parallel to the central longitudinal axis 222, but could alternatively take the form of a complete ring shoulder which shifts a ring of material generally in the axial direction of the element. In each case, the die button required will have a special design, with the teeth or ring shoulder in the central passage of the die button being set back from the end face of the die button, i.e. the end face which confronts the sheet metal panel in use. This ensures that the end face of the die button presses the panel into the ring shaped recess before the teeth or ring shoulder shift material from the cylindrical punch part of the element to lock the panel material in the ring-shaped recess.

Although the base or bottom wall 30, 130, etc. of the ring-shaped recess is conveniently made generally flat and perpendicular to the central longitudinal axis 22, 122, etc. of the element, it can also have special profiles for special purposes such as are known in the prior art for shifting material beneath undercuts within the ring-shaped recess.

I claim:

1. A fastening element attached to a plate-like element, said fastening element including an annular contact face contacting said plate-like element and an annular ring-shaped recess in said contact face having a bottom wall and opposed inner and outer side walls, at least one of said side walls having an undercut, said plate-like element including a portion deformed into said annular recess against said bottom wall beneath said side wall undercut and said inner side wall of said recess including a plurality of integral spaced projections deformed over said portion of said plate-like element, clamping said portion in said fastening element recess.

2. The fastening element defined in claim 1, wherein said inner side wall of said recess includes a plurality of radially spaced integral projections integrally deformed over said plate-like element portion.

3. The fastening element defined in claim 1, wherein said outer side wall is inclined inwardly toward said inner side wall defining said undercut.

4. The fastening element defined in claim 1, wherein said outer side wall of said recess is substantially polygonal in plan view.

5. The fastening element defined in claim 1, wherein said contact face of said fastening element includes a plurality of spaced radial recesses and said plate-like element is deformed into said radial recesses preventing rotation of said fastening element on said plate-like element.

6. The fastening element defined in claim 5, wherein each of said radial recesses in said contact face have a bottom wall inclined inwardly toward said annular ring-shaped recess and contiguous with said undercut forming a plurality of spaced undercuts in said outer side wall.

7. The fastening element defined in claim 5, wherein said outer side wall of said annular ring-shaped recess is polygonal in plane view defining a plurality of generally flat outer side surfaces and said undercuts are located generally at the midportion of each of said generally flat outer side surfaces.

8. The fastening element defined in claim 1, wherein said outer side wall of said annular ring-shaped recess includes a plurality of generally equally spaced integral projections generally at a transition from said annular contact face to said annular ring-shaped recess defining said integral projections.

9. The fastening element defined in claim 1, wherein said portion of said plate-like element is deformed into said annular ring-shaped recess by a punch having a generally cylindrical annular end portion telescopically received into said ring-shaped recess of said fastening element thereby deforming said portion of said plate-like element into said annular ring-shaped recess, said generally cylindrical end portion of said punch having an internal surface including a plurality of spaced an annular radially projecting shoulders spaced axially from an end surface of said punch which deform said integral projections on said inner side wall of said recess over said end portion of said plate-like element.

10. The fastening element defined in claim 8, wherein said annular radially projecting shoulders on said internal surface of said punch comprise a plurality of circumferentially spaced projecting shoulders, thereby deforming a plurality of spaced integral projections on said inner side wall of said annular ring-shaped recess of said fastening element over said portion of said plate-like element.

11. A fastening element attached to a plate-like element, said fastening element including a central annular pilot, an annular contact face surrounding said pilot contacting said plate-like element and an annular ring-shaped recess in said contact face having a bottom wall and opposed inner and outer side walls, said outer side wall having an inclined face overlying said bottom wall, said plate-like element including a portion deformed into said annular recess against said bottom wall beneath said inclined face of said outer side wall and said inner side wall of said recess including a plurality of circumferentially spaced integral radial projections deformed in said inner side wall over said portion of said plate-like element clamping said portion of said plate-like element in said fastening element annular ring-shaped recess.

12. The fastening element defined in claim 10, wherein said contact face of said fastening element includes a plurality of circumferentially spaced radial recesses and said plate-like element is deformed into said radial recesses preventing rotation of said fastening element relative to said plate-like element.

13. The fastening element defined in claim 11, wherein said radial recesses in said contact face each have a bottom wall inclined inwardly toward said annular ring-shaped recess and said integral radial projections deformed in said inner side wall of said annular ring-shaped recess are contiguous and radially aligned with said radial recesses.

14. The fastening element defined in claim 10, wherein said outer wall of said ring-shaped recess is substantially polygonal in plan view defining a plurality of outer side wall surfaces.

15. The fastening element defined in claim 13, wherein said inclined faces of said outer side wall of said annular ring-shaped recess are each located at a mid portion of said outer wall side surfaces.

16. A fastening element for attachment to a plate-like element, said fastening element including a central annular pilot, an annular contact face surrounding said pilot for contacting said plate-like element and an annular ring-shaped recess in said contact face having a bottom wall and opposed inner and outer side walls, said contact face of said fastening element having a plurality of circumferentially spaced radial recesses and said outer side wall of said annular ring-shaped recesses having a plurality of circumferentially spaced radial projections radially aligned with said radial recesses in said contact face overlying said bottom wall of said ring-shaped recess.

17. The fastening element defined in claim 16, wherein each of said radial recesses in said contact face of said fastening element includes a bottom wall inclined toward said ring-shaped recess overlying a radial projection.

18. The fastening element defined in claim 16, wherein said outer wall of said ring-shaped recess is generally polygonal defining a plurality of outer side wall surfaces and said radial recesses in said contact face and said radial projections in said outer side wall each located at a midportion of an outer side wall surface.

19. The fastening element defined in claim 16, wherein said radial projections each include an inclined surface overlying said bottom wall.

20. The fastening element defined in claim 16, wherein said inner side wall of said annular ring-shaped recess is deformed radially to overlie said bottom wall of said recess.

21. The fastening element defined in claim 19, wherein said inner side wall of said annular ring-shaped recess is deformed radially inwardly at a plurality of circumferentially spaced locations to overlie said bottom wall of said recess.

* * * * *